M. E. KEEHAN AND J. J. GLASS.
COUPLING FOR TRAIN PIPE CONNECTION HOSE.
APPLICATION FILED JAN. 14, 1921.

1,429,593.

Patented Sept. 19, 1922.

Witness:
R. Burkhardt.

Inventors:
Michael E. Keehan
Joseph J. Glass,
By Cromwell, Greist & Warden
Attys.

Patented Sept. 19, 1922.

1,429,593

UNITED STATES PATENT OFFICE.

MICHAEL E. KEEHAN AND JOSEPH J. GLASS, OF CHICAGO, ILLINOIS.

COUPLING FOR TRAIN-PIPE-CONNECTION HOSE.

Application filed January 14, 1921. Serial No. 437,212.

*To all whom it may concern:*

Be it known that we, MICHAEL E. KEEHAN and JOSEPH J. GLASS, citizens of the United States, both residing at Chicago, in the county of Cook and State of Illinois, have invented certain new and useful Improvements in Couplings for Train-Pipe-Connection Hose, of which the following is a specification.

This invention relates generally to pipe connections and the like, but pertains particularly to improvements in the construction of couplings designed for use in joining connection hose employed on railway cars for maintaining communication between steam, air, and similar pipes on cars throughout the length of the train.

As is well known in the art, it is customary to connect the steam, air, or similar pipes, on coupled railway cars by means of flexible hose connections which may be readily coupled and uncoupled in conjunction with the coupling and uncoupling of the draft apparatus of the cars. Under present operation, it is a practical necessity that these couplings be flexible, both as to the connection hose itself, and the actual union whereby they are joined, such flexibility being imposed by the requirement for relative lateral movement between cars in curving, etc., and the considerable variation in distance between the connected pipes incident to compression and extension of the draft apparatus under pulling and buffing influence. Furthermore, in order to guard the connections against breakage or permanent injury in the event cars are moved apart without the pipe connections having been uncoupled, the couplings are arranged so that the straightening out of the hose connections will be rendered effective to separate the coupling. An important consideration of such couplings is the necessity that they be pressure tight to conserve the fluid which they are intended to transmit, and this is particularly important in the signal and air brake couplings, since the operation of the system of which they form parts is dependent upon the maintenance of a certain pressure throughout the line. For example, a sufficient leaking from the train pipe will operate to set the brakes. Experience has shown that it has been a very difficult and unnecessarily costly problem to maintain couplings properly tight while permitting the necessary flexibility and relative movement therein, and the problem has been attacked from different angles, none of which, so far as we are now aware, has proved the correct solution.

In our present invention we have approached the problem from a new direction and have effectively solved it in a novel manner, the result of which has been to provide a novel form of pipe coupling having the proper flexibility and relative mobility of the connected portions, but maintaining under all conditions of use the proper tightness of closure of the conduit to prevent leakage therefrom.

The general object of the invention having been indicated in the foregoing, a more particular object thereof is the provision of a form of pipe connection adapted to effect automatic lubrication of parts which are depended upon to maintain the tightness of the conduit joint.

Another specific object is the provision of a self-lubricating train pipe coupling which may be embodied in forms conforming to standard couplings now in use, so that it may be employed in conjunction with apparatus now installed in cars.

A further object is the provision of a lubricating coupling for train pipes which will be effective to accomplish the placing of lubricant upon wear receiving portions of non-lubricating couplings with which it may be used, as well as upon its own wear receiving portions.

A further object of the invention is to provide a form of self-lubricating hose connection constructed and operating in such fashion that a single charge of lubricant will be effective over an extended period of time to accomplish the desired result, and facilitating a recharging with lubricant whenever desired.

Other and further objects of the invention will be pointed out hereinafter, indicated in the appended claims, or obvious upon an understanding of the invention as gained from the following disclosure; and it will be understood that this disclosure is made through the medium of a construction now believed to be a preferred embodiment, but that the same is intended simply as illustrative, and is not to be accorded the effect of limiting what we claim as the invention, short of its true and proper scope in the art.

In the accompanying drawings.

Figure 1:
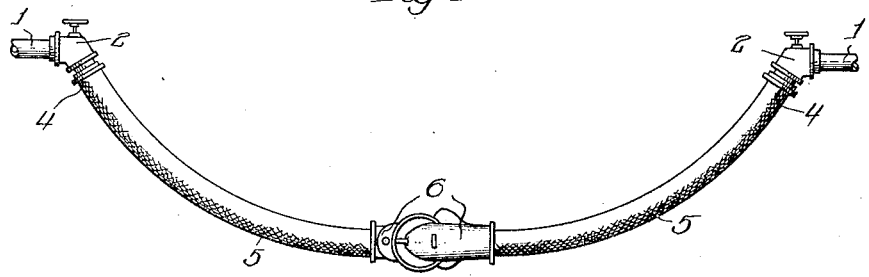
Figure 1 is a perspective view of the train pipe connection of standard type now universally employed in railway cars.

Referring to these drawings by means of the reference characters applied, let it be understood that the numerals 1 designate generally pipe portions supported in customary fashion on railway cars for the purpose of conducting fluid, such as steam and air, for the purpose of car heating, operation of air brake mechanism, signals and the like. These pipe portions are disposed with their ends terminating at established standard distances from the center line of the cars upon which they are mounted, with reference to which position the location of the coupling mechanism is also established. These pipe portions terminate in cocks 2, to which, by means of demountable connections 4, are connected sections of flexible hose 5 constituting continuations of the conduits afforded by the pipes. The pipes which are to be connected at the meeting ends of cars terminate on opposite sides of the median line of the cars, so that the connections joining the cocks 2 pass obliquely beneath the draft mechanism by which the cars are coupled. The hose sections 5, at their lower extremities are equipped with cooperating coupling members 6, the construction of which is prescribed and standard, so that couplings may be effected between all cars.

Figure 2:
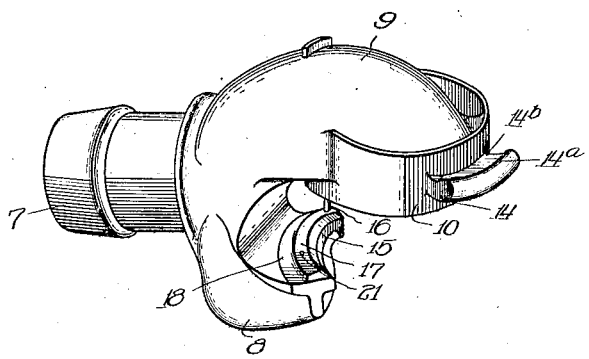
Fig. 2 is a perspective view of a pipe coupling embodying our invention.
Figure 3:
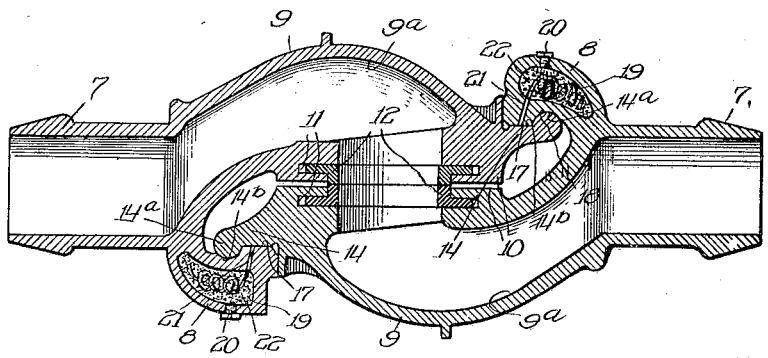
Fig. 3 is a longitudinal sectional view through a complete coupling embodying our invention.

A coupling member conforming to present standard requirements is illustrated in Fig. 2, wherein it will be observed that it includes a nipple 7 adapted for insertion into the end of the hose section where it is suitably retained by a clamp, and a body portion made up of a cam jaw 8 and a pipe jaw 9. The latter is formed with an interior channel 9$^a$ in continuation of the bore of the nipple 7, and terminates in a junction boss 10 having a plane finished lateral face directed toward the cam jaw 8. As seen in Fig. 3 this face is apertured to afford communication with the channel 9$^a$, and the material thereabout is shaped to form a gasket seat 11 in which is seated an annular gasket 12 having its wall of sufficient depth to extend beyond the face of the junction boss. At its outer extremity the junction boss carries a segmental rib 14 having an arcuate upstanding retaining portion 14$^a$ finished with a rounded contour. The cam jaw 8 includes an outstanding ledge 15 spaced apart from the face of the junction boss 10 and terminating on an arc substantially parallel with the periphery of the boss. At one end of the cam jaw is supported a stop pin 16 seated therein and in the pipe jaw 9, and on the inner side of the ledge 15 is formed an arcuate cam 17 in the nature of an inclined plane of increasing height as it approaches the stop member 16 so that its end adjacent the stop is nearer the junction boss than is its other end. Outside the cam 17 is an arcuate depression forming a seat 18 conforming in shape and dimensions to the retaining member 14$^a$.

The foregoing constitutes the structure of a form of coupling member now in use, and it will be understood that right and left hand coupling members may be joined by placing their junction bosses face to face with the gaskets in register, and then rotating them so that the ribs 14 are moved between the cam jaw and the junction boss, the bearing surface 14$^b$ of each coupling member rides upon the surface of the cam 17 of the other, and the retaining member 14$^a$ of each riding in the seat 18 of the other. By such rotation the junction bosses of the cooperating couplings are cammed toward each other so that a close joint is made by the compression of the gaskets upon each other. Practice has demonstrated that, due to the almost continuous movement to which these couplings are subjected when in use, that the joint becomes loose with the result that the contained fluid is permitted to escape. We have ascertained that the primary cause of this failure of the coupling is due to wear upon the parts which are depended upon to effect and maintain the compression between the gaskets, viz, the cams 17 and bearing portions 14$^b$.

In order to obviate such wear, and thereby contribute to the continued effectiveness and term of usefulness of the couplings, we propose to provide as a part thereof a lubricant chamber, designated by the numeral 19 in Figs. 2 and 3. This may be provided in any portion of the device suitably convenient to the wear receiving parts, which, in the form illustrated, may most conveniently be the cam jaw. This chamber may be cored in the casting of the coupling, the print for the core forming an opening through the outer wall of the chamber, which opening may be subsequently screw threaded and fitted with a closure plug 20. From the interior of the lubricant chamber a channel 21 is drilled to the surface of the cam 17, the same forming a discharge channel for lubricant from the chamber and being adapted to dispose the lubricant discharged upon the effective surface of the cam. As a means for limiting and controlling the discharge of lubricant, a wick 22 may be threaded through the channel 21 and disposed in the chamber 19. The chamber being charged with a suitable lubricant, the same will be gradually conducted therefrom through the channel 21 and disposed upon the surface of the cam 17, upon which it will be distributed by various influences, such as the relative movement of the couplers, the coupling and uncoupling thereof, and whence it will also be spread upon the bearing portions 14$^b$ of coupling members with which it may be used. By virtue of this feature, therefore, it will be observed that our improved coupling will be effective not only to lubricate its own wear receiving portions, but that it will lubricate also couplings of the non-lubricating type with which it may be coupled, so that the influence of a small proportionate number of our couplings in use will exercise a beneficial effect upon a large number of non-lubricating couplings.

The usual term of usefulness of present standard couplings as now employed in average service is about four years, their term of usefulness being dependent upon their effectiveness in maintaining tight connections, and their efficacy in this regard, as mentioned above, being dependent upon the maintenance of the cams and bearing portions at effective heights. The use of self-lubricating couplings will be effective to greatly reduce the rapidity of wear on these parts, both by virtue of the fact that the lubricant will prevent the destructive rubbing of the cooperating parts, and by virtue of the fact that it will form a protective coating for said parts which will to a large degree prevent rusting. The effectiveness of the device is not limited simply to the prevention of wear on the cam and cooperating bearing portion 14$^b$, but is also effective as to the locking connection comprising the retaining member 14$^a$ and the seat 18. This is important in preventing the development of play between connected couplings which would permit movement of the gaskets out of proper register, and resulting leakage. As estimated at present, a single charge of suitable lubricant would probably last for two years or more, so that, upon original installation, the device would be good for almost twice the term of present devices, even without recharging. Due to the accessibility of the plug 20, the lubricant chamber may be filled easily at any time, so that with proper refilling, the life of a coupling of our approved construction will be vastly greater than that of the kind now employed. With this must be considered also the increase in life of other couplings with which ours may be used.

We claim:

1. A pipe coupling comprising relatively movable members having interlocking portions, one of said members having a portion for containing a lubricant with an outlet therefrom to discharge lubricant on interlocking portions.

2. A train pipe coupling having a portion for carrying a lubricant and a portion for conducting lubricant therefrom to wear receiving parts.

3. A train pipe coupling member formed with a lubricant chamber within the body portion thereof.

4. A train pipe coupling formed with a lubricant chamber therein and channels for the introduction of lubricant thereto and discharge of lubricant therefrom.

5. In a train pipe coupling, relatively movable members having wedging portions adapted to interlock and formed with a lubricant chamber arranged to discharge lubricant on interlocking parts.

6. In a train pipe coupling, relatively movable members arranged to interlock and form a connection between separate conduits, said members including a cam portion whereby they are retained in engagement, and a portion forming a lubricant chamber arranged to deposit lubricant on the cam portion.

7. In a train pipe coupling relatively movable members including cooperating compressible gaskets and having parts arranged to bear against each other to compress said gaskets and a portion forming a lubricant chamber arranged to contain and discharge lubricant onto said parts.

8. A train pipe coupling formed with a lubricant chamber and a restricted conduit arranged to conduct lubricant therefrom.

9. A train pipe coupling formed with a lubricant chamber having a discharge duct, and a wick for influencing movement of lubricant from said chamber through said duct.

10. A train pipe coupling including a cam jaw and a cam supported thereon, said cam jaw being provided with an internal chamber and with a duct leading therefrom to the surface of said cam.

In testimony whereof we have hereunto signed our names in the presence of two subscribing witnesses.

MICHAEL E. KEEHAN.
JOSEPH J. GLASS.

Witnesses:
 FRANCES GILLESPIE,
 C. S. BUTLER.